US009896969B2

(12) United States Patent
Sheridan et al.

(10) Patent No.: US 9,896,969 B2
(45) Date of Patent: Feb. 20, 2018

(54) ZERO OR LOW LEAKAGE OIL TRANSFER BEARING

(71) Applicant: United Technologies Corporation, Hartford, CT (US)

(72) Inventors: William G. Sheridan, Southington, CT (US); Marc J. Muldoon, Marlborough, CT (US); Michael E. McCune, Colchester, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 323 days.

(21) Appl. No.: 14/663,207

(22) Filed: Mar. 19, 2015

(65) Prior Publication Data

US 2016/0273386 A1    Sep. 22, 2016

(51) Int. Cl.
| | |
|---|---|
| F01D 25/18 | (2006.01) |
| F16J 15/16 | (2006.01) |
| F16H 57/04 | (2010.01) |
| F16J 15/42 | (2006.01) |
| F01D 25/16 | (2006.01) |
| F01D 11/02 | (2006.01) |

(52) U.S. Cl.
CPC ............ *F01D 25/186* (2013.01); *F01D 11/02* (2013.01); *F01D 25/166* (2013.01); *F01D 25/183* (2013.01); *F16H 57/0426* (2013.01); *F16J 15/164* (2013.01); *F16J 15/42* (2013.01); *F05D 2240/61* (2013.01)

(58) Field of Classification Search
CPC ....... F16J 15/42; F16C 41/005; F16C 17/028; F16C 33/72; F16C 33/1065; F16C 33/6677; F04D 29/104; F01D 25/16; F01D 25/18; F01D 25/1861; F16L 39/04; F16L 39/06; F16H 57/0426
USPC ................ 285/11, 121.3, 133.2, 145.2, 190; 384/322, 397, 400; 184/100; 277/424, 277/427

See application file for complete search history.

(56) References Cited

U.S. PATENT DOCUMENTS

| | | | | |
|---|---|---|---|---|
| 2,544,423 | A | * | 3/1951 | Goddard ................. F16J 15/42 |
| | | | | 277/424 |
| 2,571,352 | A | * | 10/1951 | Webb ...................... F16J 15/42 |
| | | | | 277/350 |

(Continued)

FOREIGN PATENT DOCUMENTS

| | | |
|---|---|---|
| EP | 1460319 | 9/2004 |
| EP | 1582703 | 10/2005 |
| WO | 2006059981 | 6/2006 |

OTHER PUBLICATIONS

Extended European Search Report dated Aug. 24, 2016 in European Application No. 16161262.7.

*Primary Examiner* — Ninh H Nguyen
*Assistant Examiner* — Topaz L Elliott
(74) *Attorney, Agent, or Firm* — Snell & Wilmer L.L.P.

(57) ABSTRACT

A transfer bearing assembly is configured to allow a flow of a fluid from an inlet tube to a channel defined by a rotating shaft. The transfer bearing assembly includes a body having an axially forward side and an axially aft side and a first wing having an axially aft end coupled to the axially forward side and an axially forward end. The transfer bearing assembly also includes a first side plate having a radially outward end coupled to the axially forward end of the first wing and a radially inward end.

20 Claims, 3 Drawing Sheets

(56) References Cited

U.S. PATENT DOCUMENTS

| | | | | |
|---|---|---|---|---|
| 2,684,591 | A | * | 7/1954 | Lundquist ................. F16H 1/28 |
| | | | | 475/158 |
| 4,460,180 | A | * | 7/1984 | Koistinen ............. F04D 29/106 |
| | | | | 277/304 |
| 4,463,956 | A | * | 8/1984 | Malott .................... F01D 25/18 |
| | | | | 277/412 |
| 4,902,197 | A | * | 2/1990 | Rhodes ................. F04D 29/104 |
| | | | | 277/427 |
| 5,088,742 | A | * | 2/1992 | Catlow ................... F01D 11/02 |
| | | | | 277/430 |
| 5,239,750 | A | | 8/1993 | Wright |
| 6,164,658 | A | | 12/2000 | Collin |
| 6,183,208 | B1 | * | 2/2001 | Qandil .................... F04D 13/08 |
| | | | | 310/54 |
| 8,484,942 | B1 | | 7/2013 | McCune et al. |
| 8,813,469 | B2 | | 8/2014 | Sheridan |
| 2005/0121857 | A1 | * | 6/2005 | Andersson ............... F16J 15/42 |
| | | | | 277/431 |
| 2009/0065306 | A1 | * | 3/2009 | Kawamoto ......... F16H 57/0426 |
| | | | | 184/109 |
| 2011/0250056 | A1 | | 10/2011 | Munson |

* cited by examiner

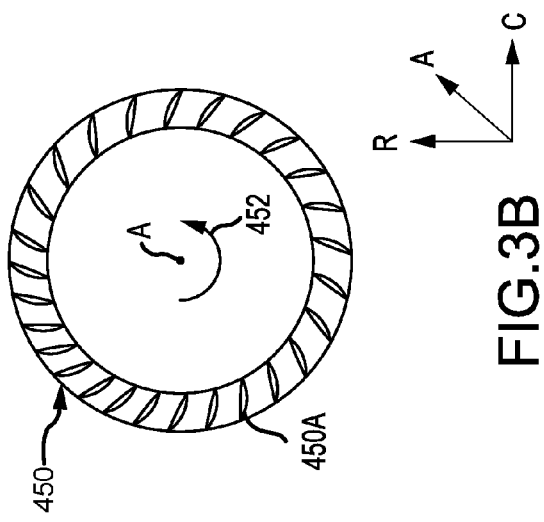
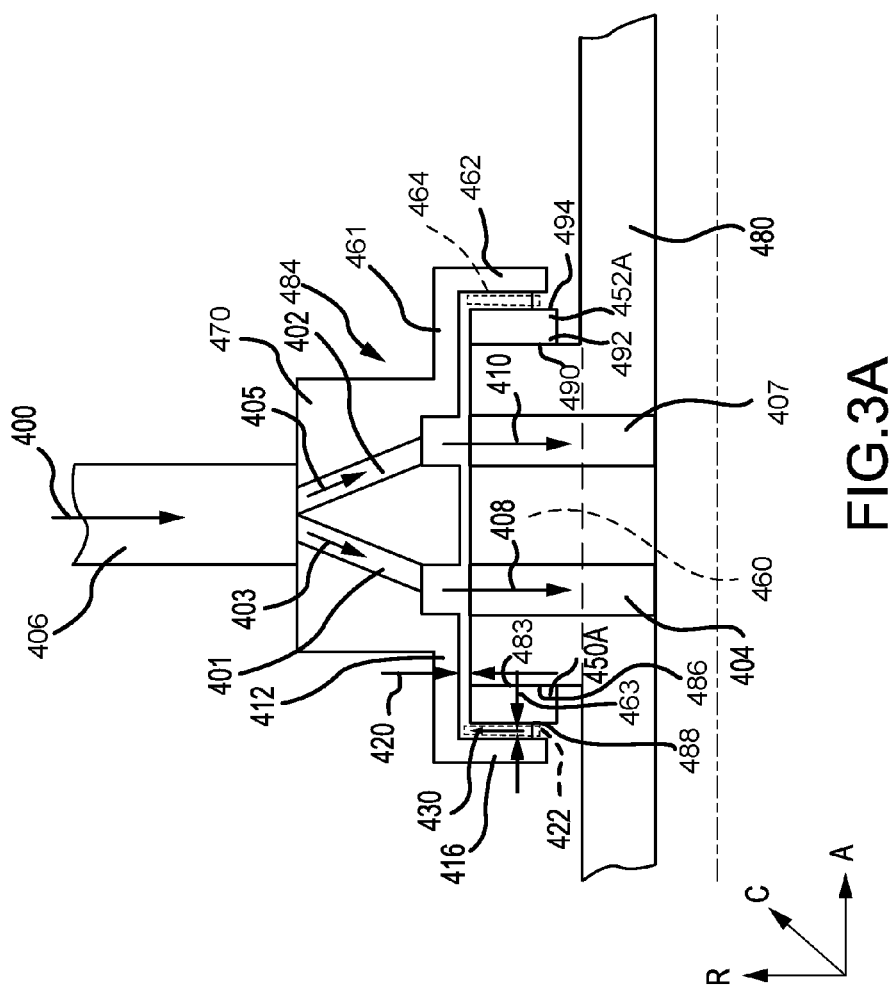

ZERO OR LOW LEAKAGE OIL TRANSFER BEARING

FIELD

The present disclosure relates generally to lubrication systems for aircraft and, more particularly, to a lubrication system having a transfer bearing assembly for delivering lubricant to a rotating shaft with zero or low leakage of lubricant.

BACKGROUND

Gas turbine engines typically include a fan section, a compressor section, a combustor section and a turbine section. A gear system may receive torque from the turbine section at a given angular velocity, change the angular velocity and deliver torque to the fan section at a different angular velocity than the angular velocity received at the turbine section. The fan section includes a plurality of fan blades mounted to a hub supported by bearings for rotation about the engine axis. The hub receives the force from the gear system which causes the fan blades to rotate about the engine axis. The gear system and the bearings of the fan section function optimally when lubricated.

SUMMARY

What is described is a transfer bearing assembly configured to allow a flow of a fluid from an inlet tube to a channel defined by a rotating shaft. The transfer bearing assembly includes a body having an axially forward side and an axially aft side and a first wing having an axially aft end coupled to the axially forward side and an axially forward end. The transfer bearing assembly also includes a first side plate having a radially outward end coupled to the axially forward end of the first wing and a radially inward end.

Also described is a lubrication system having an inlet tube configured to allow fluid to flow. The lubrication system also includes a transfer bearing assembly that includes a body defining a body channel configured to be aligned with the inlet tube, the body having an axially forward side and an axially aft side. The transfer bearing assembly also includes a first wing having an axially aft end coupled to the axially forward side and an axially forward end and a first side plate having a radially outward end coupled to the axially forward end of the first wing and a radially inward end. The lubrication system also includes a rotating shaft configured to rotate with respect to the transfer bearing assembly and defining a channel configured to be aligned with and receive fluid from the body channel.

Also described is a lubrication system that includes a transfer bearing assembly. The transfer bearing assembly includes a body having an axially forward side and an axially aft side and a first wing having an axially aft end coupled to the axially forward side and an axially forward end. The transfer bearing assembly also includes a first side plate having a radially outward end coupled to the axially forward end of the first wing and a radially inward end. The lubrication system also includes a rotating shaft configured to rotate with respect to the transfer bearing assembly. The rotating shaft has a fluid receiving portion that extends radially outward from the rotating shaft and has an aft side and a forward side. The forward side of the fluid receiving portion, the first wing and the first side plate define an area. The lubrication system also includes a canted pumping vane coupled to the forward side of the fluid receiving portion and extending axially forward into the area.

The foregoing features and elements are to be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, is best obtained by referring to the detailed description and claims when considered in connection with the drawing figures, wherein like numerals denote like elements.

FIG. 3A illustrates a transfer bearing assembly having two wings and two side plates positioned radially outward from a rotating shaft and coupled to two canted pumping vanes, in accordance with various embodiments; and FIG. 3B illustrates a plurality of canted pumping vanes positioned about the rotating shaft of FIG. 3A, in accordance with various embodiments.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
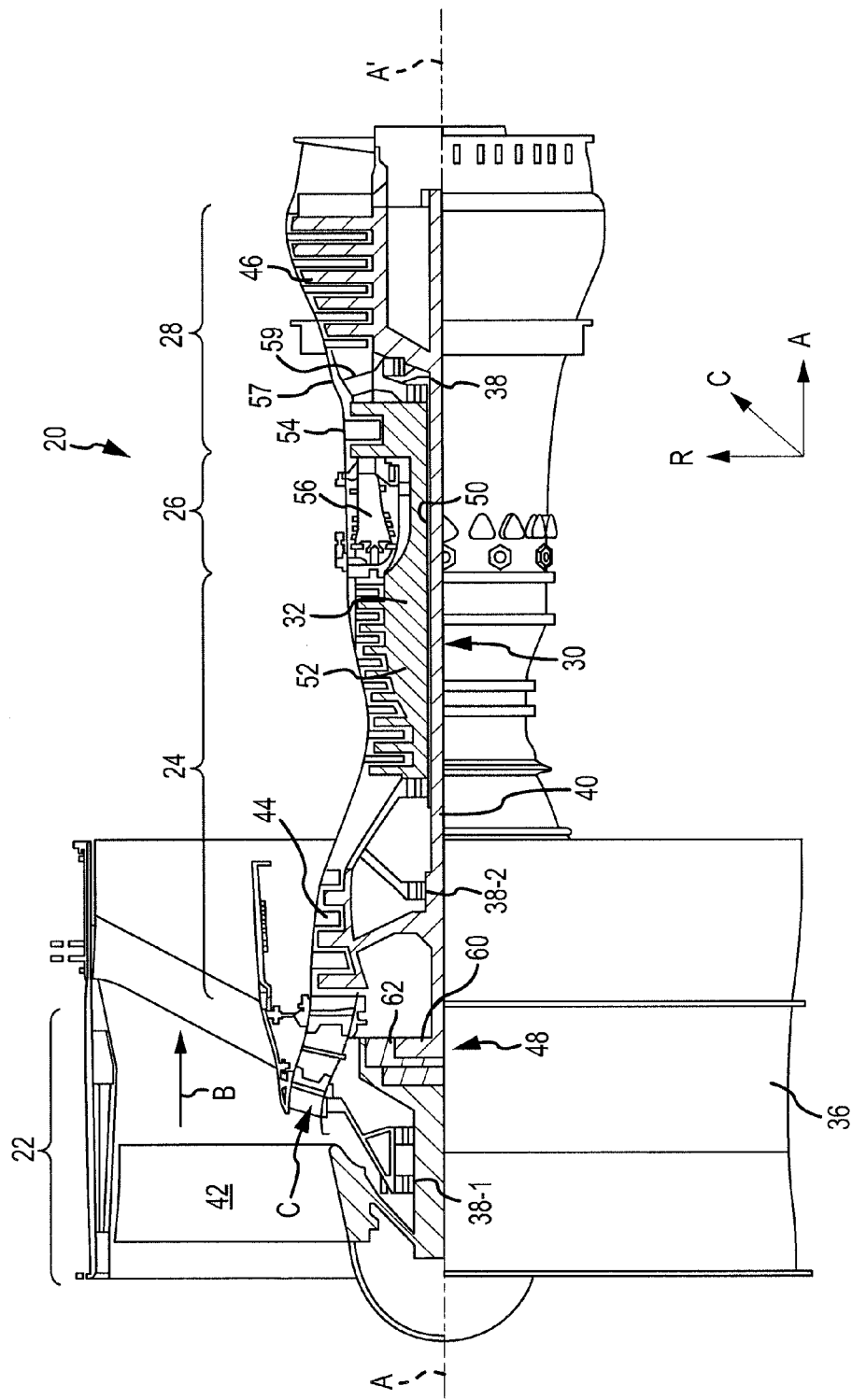
FIG. 1 is a cross-sectional view of an exemplary gas turbine engine, in accordance with various embodiments.

With reference to FIG. 1, a gas turbine engine 20 is provided. An axis labeled A-R-C is illustrated in each of the figures, in which the axial (A), radial (R) and circumferential (C) directions are illustrated. As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion. As utilized herein, radially inward refers to the negative R direction and radially outward refers to the R direction.

Gas turbine engine 20 may be a two-spool turbofan that generally incorporates a fan section 22, a compressor section 24, a combustor section 26 and a turbine section 28. Alternative engines include an augmentor section among other systems or features. In operation, fan section 22 drives air along a bypass flow-path B while compressor section 24 drives air along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 generally comprises a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 generally includes an inner shaft 40 that interconnects a fan 42, a low pressure (or first) compressor section 44 and a low pressure (or first) turbine section 46. Inner shaft 40 is connected to fan 42 through a geared architecture 48 that can drive fan 42 at a lower speed than low speed spool 30. Geared architecture 48 includes a gear assembly 60 enclosed within a gear housing 62. Gear assembly 60 couples inner shaft 40 to a rotating fan structure. High speed spool 32 includes an outer shaft 50 that interconnects a high pressure (or second) compressor section 52 and high pressure (or second) turbine section 54. A combustor 56 is located between high pressure compressor 52 and high pressure turbine 54. A mid-turbine frame 57 of engine static structure 36 is located generally between high pressure turbine 54 and low pressure turbine 46. Mid-turbine frame 57 supports one or more bearing systems 38 in turbine section 28. Inner shaft 40 and outer shaft 50 are concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C is compressed by low pressure compressor section 44 then high pressure compressor 52, mixed and burned with fuel in combustor 56, then expanded over high pressure turbine 54 and low pressure turbine 46. Mid-turbine frame 57 includes airfoils 59 which are in the core airflow path. Turbines 46, 54 rotationally drive the respective low speed spool 30 and high speed spool 32 in response to the expansion.

Gas turbine engine 20 is a high-bypass ratio geared aircraft engine. The bypass ratio of gas turbine engine 20 may be greater than about six (6). The bypass ratio of gas turbine engine 20 may also be greater than ten (10:1). Geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). The diameter of fan 42 may be significantly larger than that of the low pressure compressor section 44, and the low pressure turbine 46 may have a pressure ratio that is greater than about five (5:1). The pressure ratio of low pressure turbine 46 is measured prior to inlet of low pressure turbine 46 as related to the pressure at the outlet of low pressure turbine 46. It should be understood, however, that the above parameters are exemplary of various embodiments of a suitable geared architecture engine and that the present disclosure contemplates other turbine engines including direct drive turbofans.

The next generation turbofan engines are designed for higher efficiency and use higher pressure ratios and higher temperatures in high pressure compressor 52 than are conventionally experienced. These higher operating temperatures and pressure ratios create operating environments that cause thermal loads that are higher than the thermal loads conventionally experienced, which may shorten the operational life of current components.

Figure 2:
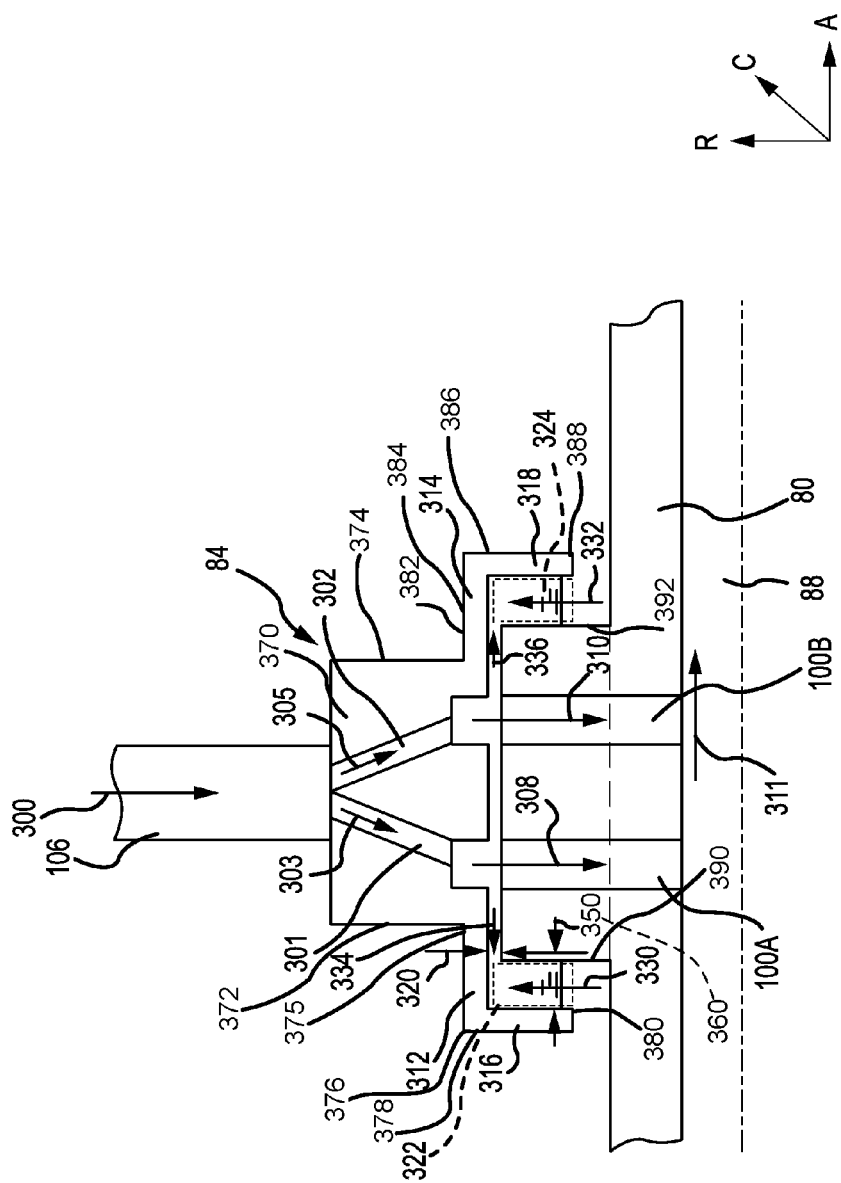
FIG. 2 illustrates a transfer bearing assembly having two wings and two side plates positioned radially outward from a rotating shaft, in accordance with various embodiments.

In various embodiments and with reference to FIGS. 1 and 2, gear assembly 60 may be utilized to drive fan section 22. This allows fan section 22 to rotate at a different speed than turbine section 28, which may increase the efficiency and propulsion of gas turbine engine 20. In this architecture, a rotating shaft 80 driven by turbine section 28 provides an input to gear assembly 60 that drives fan section 22 at a reduced speed such that turbine section 28 and fan section 22 can each rotate at different speeds.

Fan section 22 includes a plurality of fan blades mounted to a hub supported by bearings for rotation about the engine central longitudinal axis A-A'. The hub is coupled to an output of gear assembly 60. The effectiveness of the bearings and gear assembly 60 is increased when lubricated. The bearings and gear assembly 60 may receive lubricant supplied via lubricant passages such as a inlet tube 106 through a transfer bearing assembly 84 and a cavity 88 defined by rotating shaft 80.

With reference now to FIG. 2, transfer bearing assembly 84 is coupled to inlet tube 106 and positioned radially outward from rotating shaft 80. In that regard, rotating shaft 80 rotates with respect to transfer bearing assembly 84 and inlet tube 106. Inlet tube 106 may be any tubing or piping defining a cavity through which fluid may flow.

The lubricant may be pressurized to cause it to flow through inlet tube 106 towards rotating shaft 80 as indicated by arrow 300. When the lubricant reaches transfer bearing assembly 84, it may flow through a body channel 301 and a body channel 302 defined by transfer bearing assembly 84, as indicated by arrow 303 and arrow 305. In various embodiments, transfer bearing assembly 84 may have any number of channels for transferring lubricant.

A fluid receiving portion 360 of rotating shaft 80 extends radially outward from rotating shaft 80 and defines a channel 100A and a channel 100B that align with body channel 301 and body channel 302, respectively. Channel 100A and channel 100B may also be described as holes, slots or any other shaped passage opening that allows fluid to pass from outside of shaft 80 to inside of shaft 80. In that regard, lubricant that is displaced through body channel 301 and body channel 302 may flow into channel 100A and channel 100B as indicated by arrow 308 and arrow 310. As with transfer bearing assembly 84, rotating shaft 80 may have any number of channels for receiving lubricant, and in some various embodiments, rotating shaft 80 may have the same number of channels as transfer bearing assembly 84.

It is desirable for transfer bearing assembly 84 and rotating shaft 80 to avoid contact, as contact between rotating shaft 80 and non-rotating transfer bearing assembly 84 may cause friction which, in turn, may generate heat. In that regard, transfer bearing assembly 84 may be displaced from rotating shaft 80 by a distance 320 in the radial direction.

Because transfer bearing assembly 84 is separated from rotating shaft 80 by distance 320, some of the lubricant may leak between transfer bearing assembly 84 and rotating shaft 80 as indicated by arrow 334 and arrow 336. It is desirable to reduce or prevent this leakage of the lubricant, as the less lubricant is leaked, the less often lubricant will need to be replaced. In that regard, transfer bearing assembly 84 may have a body 370 having a rectangular shape and having an axially forward side 372 and an axially aft side 374. A first wing 312 of transfer bearing assembly 84 may have an elongated shape having an axially aft end 375 coupled to a radially inward end of axially forward side 372 of body 370. First wing 312 may extend forward to an axially forward end 376 of first wing 312. Axially forward end 376 may be coupled to a radially outward end 378 of a first side plate 316. First side plate 316 may have an elongated shape and extend radially inward from first wing 312 to a radially inward end 380. Similarly, a second wing 314 may have an elongated shape having an axially forward end 382 coupled to a radially inward end of axially aft side 374 of body 370. Second wing 314 may extend axially aft to an axially aft end 384 of second wing 314. Axially aft end 384 may be coupled to a radially outward end 386 of a second side plate 318. Second side plate 318 may have an elongated shape and extend radially inward from second wing 314 to a radially inward end 388.

An area 322 is defined by first side plate 316, first wing 312 and a forward side 390 of fluid receiving portion 360 of rotating shaft 80. Another area 324 that is the same as or similar to area 322 is likewise defined by second side plate 318, second wing 314 and an aft side 392 of fluid receiving portion 360. Area 322 and area 324 may receive the leakage lubricant illustrated by arrow 334 and arrow 336.

The rotation of rotating shaft 80 relative to transfer bearing assembly 84 creates a negative pressure relative to the leakage lubricant, as indicated by arrows 330, 332. The negative pressure is caused by centrifugal force applied to the lubricant in area 322 by rotating shaft 80. Rotating shaft 80 creates a rotating head of lubricant in area 322 that causes the negative pressure. In that regard, first side plate 316 forms a hydraulic seal with fluid receiving portion 360 of rotating shaft 80. When the negative pressure, indicated by arrows 330, 332, is equal to or greater than the pressure of the leakage lubricant, indicated by arrow 334, lubricant will not leak between first side plate 316 and rotating shaft 80 as the equal pressures will cause the lubricant to remain in area 322.

Fluid receiving portion 360 of rotating shaft 80 may have an axial distance 350 from first side plate 316. In various embodiments, distance 350 may be larger than distance 320. Distance 350 may be large enough so that lubricant in area 324 can develop the rotating head that creates the negative pressure. Similarly, distance 350 may be large enough to prevent undesirable heat formation by the friction between lubricant, rotating shaft 80 and transfer bearing assembly 84. Additionally, aircraft maneuvers, heat or the like may cause rotating shaft 80 to move axially (e.g., in the direction of arrow 311) relative to transfer bearing assembly 84. In that regard, distance 350 may also be large enough such that rotating shaft 80 may move forward or aft a predetermined amount without making contact with transfer bearing assembly 84.

With reference now to FIGS. 2 and 3A, another transfer bearing assembly 484 may be coupled to a inlet tube 406 similar to inlet tube 106 and positioned adjacent a rotating shaft 480 similar to rotating shaft 80. Transfer bearing assembly 484 may be similar to transfer bearing assembly 84 of FIG. 2.

With reference now to FIG. 3A, transfer bearing assembly 484 may include a body channel 401 and a body channel 402 that received lubricant from inlet tube 406. Lubricant may flow to a channel 404 and a channel 407 of a fluid receiving portion 460 of rotating shaft 480 from inlet tube 406 via body channel 401 and body channel 402. Transfer bearing assembly 484 may also include a first wing 412 that extends axially forward from a body 470 of transfer bearing assembly and is positioned a distance 420 from fluid receiving portion 460 of rotating shaft 480. A side plate 416 may be coupled to first wing 412 and extend radially inward from an axially forward end of first wing 412. Transfer bearing assembly 84 may also include a second wing 461 and a second side plate 462.

Lubricant may flow through inlet tube 406 as indicated by arrow 400, flow through body channel 401 and body channel 402 as indicated by arrow 403 and 405 and flow into channel 404 and channel 407 as indicated by arrow 408 and 410. Lubricant may leak between fluid receiving portion 460 of rotating shaft 480 and first wing 412. In a similar manner as illustrated in FIG. 2, centrifugal force caused by rotating shaft 480 on lubricant in an area 422 may create a negative pressure applied to lubricant in area 422 as indicated by arrow 430. It is desirable for this negative pressure in area 422 to be substantially equal (i.e., within ten percent (10%), or within 20% or within 30%) to the leakage pressure indicated by arrow 434 to prevent leakage of the lubricant.

In order to increase the negative pressure in area 422, a canted pumping vane 450A may be coupled to an axially forward side 483 of fluid receiving portion 460 of rotating shaft 480. In that regard, canted pumping vane 450A may rotate with rotating shaft 480 relative to transfer bearing assembly 484. Canted pumping vane 450A may have a rectangular shape having an axially aft side 486 coupled to axially forward side 483 of fluid receiving portion 460 and an axially forward side 488. Axially forward side 488 may be a distance 463 from side plate 416. With brief reference to FIGS. 2 and 3A, distance 463 may be smaller than distance 350 between fluid receiving portion 360 and first side plate 316. This reduction in size may create a larger negative pressure in area 422. In various embodiments, area 422 may be large enough to allow the circulating head of lubricant, to prevent undesirable heat and to reduce the likelihood of contact between canted pumping vane 450A and side plate 416. Another canted pumping vane 452A may have an axially forward side 492 coupled to an axially aft end 490 of fluid receiving portion 460 and an axially aft side 494. Canted pumping vane 452A may define an area 464 with axially aft end 494 of fluid receiving portion 460.

With reference now to FIGS. 3A and 3B, rotating shaft 480 may include or be coupled to a plurality of canted pumping vanes 450 positioned about rotating shaft 480. In that regard, the plurality of canted pumping vanes 450 may function as an impeller and further increase the negative pressure of lubricant in area 422 by creating a radially outward velocity of lubricant in area 422. Another plurality of canted pumping vanes including canted pumping vane 452A may be similar to the plurality of canted pumping vanes 450 and be positioned aft of the plurality of canted pumping vanes 450.

The plurality of canted pumping vanes 450 are canted with respect to the radial direction. In response to rotation of canted pumping vane 450 in the direction indicated by arrow 452, the rotation, in combination with the shape of the canted pumping vanes 450, will apply the radially outward velocity to lubricant in area 422. In various embodiments, the centrifugal force in area 422, along with the radially outward velocity created by the plurality of rotating canted pumping vanes, may create a negative pressure in area 422, illustrated by arrow 430, that is substantially equal to the leakage pressure indicated by arrow 434.

In various embodiments, canted pumping vane 450A may be formed with rotating shaft 480 or may be added to rotating shaft 480 at a later time. For example, canted pumping vane 450A may be coupled to rotating shaft 480 via welding, machining, brazing, additive manufacturing or the like.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A transfer bearing assembly configured to allow a flow of a fluid from an inlet tube to a channel defined by a rotating shaft, the transfer bearing assembly comprising:
   a body having an axially forward side and an axially aft side;
   a first wing having an axially aft end coupled to the axially forward side and an axially forward end; and
   a first side plate extending radially, the first side plate having a radially outward end coupled to the axially forward end of the first wing and a radially inward end, wherein the first side plate is configured to be axially forward of a forward-most portion of a radially extending portion of the rotating shaft.

2. The transfer bearing assembly of claim 1, wherein the first wing and the first side plate define an area with the forward-most portion of the radially extending portion of the rotating shaft, wherein the first side plate and the forward-most portion of the radially extending portion are adjacent and parallel.

3. The transfer bearing assembly of claim 1, further comprising:
   a second wing having a second axially forward end coupled to the axially aft side and a second axially aft end; and
   a second side plate extending radially, the second side plate having a second radially outward end coupled to the second axially aft end of the second wing and a second radially inward end, wherein the first side plate is configured to be axially forward of a forward-most portion of a radially extending portion of the rotating shaft.

4. The transfer bearing assembly of claim 1, wherein the body defines a first body channel and a second body channel that are configured to receive the fluid from the inlet tube, wherein the channel of the rotating shaft is a first channel that receives the fluid from the first body channel and the rotating shaft further comprises a second channel that receives the fluid from the second body channel.

5. The transfer bearing assembly of claim 4, wherein a gap is defined between the transfer bearing assembly and the rotating shaft such that an amount of the fluid may leak between the first wing and the rotating shaft at a first pressure where the first channel and the second channel of the rotating shaft align with the first body channel and the second body channel, respectively.

6. The transfer bearing assembly of claim 5, wherein the rotating shaft creates a sealing force that opposes the first pressure such that an amount of fluid that may leak between the first wing and the rotating shaft is reduced in response to the rotating shaft rotating.

7. The transfer bearing assembly of claim 1, wherein the rotating shaft rotates with respect to the transfer bearing assembly.

8. A lubrication system comprising:
   an inlet tube configured to allow fluid to flow;
   a transfer bearing assembly comprising:
      a body defining a body channel configured to be aligned with the inlet tube, the body having an axially forward side and an axially aft side,
      a first wing having an axially aft end coupled to the axially forward side and an axially forward end, and a first side plate extending radially, the first side plate having a radially outward end coupled to the axially forward end of the first wing and a radially inward end; and a rotating shaft comprising a fluid receiving portion that extends radially outward from the rotating shaft, wherein the fluid receiving portion defines a channel configured to be aligned with and receive the fluid from the body channel and has a forward-most side, wherein the forward-most side of the fluid receiving portion, the first wing and the first side plate define an area.

9. The lubrication system of claim 8, wherein the transfer bearing assembly further includes a second wing having a second axially forward end coupled to the axially aft side and a second axially aft end and a second side plate extending radially, the second side plate having a second radially outward end coupled to the second axially aft end of the second wing and a second radially inward end.

10. The lubrication system of claim 8, wherein the rotating shaft further defines a cavity in fluid communication with the channel of the rotating shaft and extending in an axial direction.

11. The lubrication system of claim 10, wherein the transfer bearing assembly does not physically contact the rotating shaft such that an amount of the fluid may leak between the first wing and the rotating shaft at a first pressure where the channel of the rotating shaft aligns with the body channel.

12. The lubrication system of claim 11, wherein the rotating shaft creates a sealing force that opposes the first pressure such that an amount of fluid that may leak between the first wing and the rotating shaft is reduced in response to the rotating shaft rotating.

13. The lubrication system of claim 8, wherein the body channel of the body of the transfer bearing assembly is a first body channel and the body further defines a second body channel, wherein the channel of the fluid receiving portion of the rotating shaft is a first channel and the fluid receiving portion further defines a second channel, wherein the first body channel and the second body channel are configured to receive the fluid from the inlet tube, wherein the first channel receives the fluid from the first body channel and the second channel receives the fluid from the second body channel.

14. The lubrication system of claim 8, further comprising a canted pumping vane coupled to the forward-most side of the fluid receiving portion and extending axially forward into the area.

15. The lubrication system of claim 14, wherein the canted pumping vane is one of a plurality of canted pumping vanes positioned circumferentially about the rotating shaft.

16. The lubrication system of claim 14, wherein the canted pumping vane creates a radially outward velocity of fluid in the area.

17. A lubrication system comprising:
a transfer bearing assembly having:
a body having an axially forward side and an axially aft side,
a first wing having an axially aft end coupled to the axially forward side and an axially forward end, and
a first side plate extending radially, the first side plate having a radially outward end coupled to the axially forward end of the first wing and a radially inward end; and
a rotating shaft configured to rotate with respect to the transfer bearing assembly and having a fluid receiving portion that extends radially outward from the rotating shaft and has an aft-most side and a forward-most side such that the forward-most side of the fluid receiving portion, the first wing and the first side plate define an area; and
a canted pumping vane coupled to the forward-most side of the fluid receiving portion and extending axially forward into the area.

18. The lubrication system of claim 17 wherein the canted pumping vane is one of a plurality of canted pumping vanes positioned circumferentially about the rotating shaft.

19. The lubrication system of claim 17, wherein the canted pumping vane creates a radially outward velocity of fluid in the area.

20. The lubrication system of claim 17, further comprising a second canted pumping vane coupled to the aft-most side of the fluid receiving portion and extending axially aft.

* * * * *